June 18, 1963 T. J. SLINGLUFF 3,093,933
ELECTRICAL DUCTS AND FITTINGS

Filed Oct. 15, 1959 3 Sheets-Sheet 1

INVENTOR.
THOMAS J. SLINGLUFF
BY Harry B. Keck
ATTORNEY

June 18, 1963  T. J. SLINGLUFF  3,093,933
ELECTRICAL DUCTS AND FITTINGS
Filed Oct. 15, 1959  3 Sheets-Sheet 2
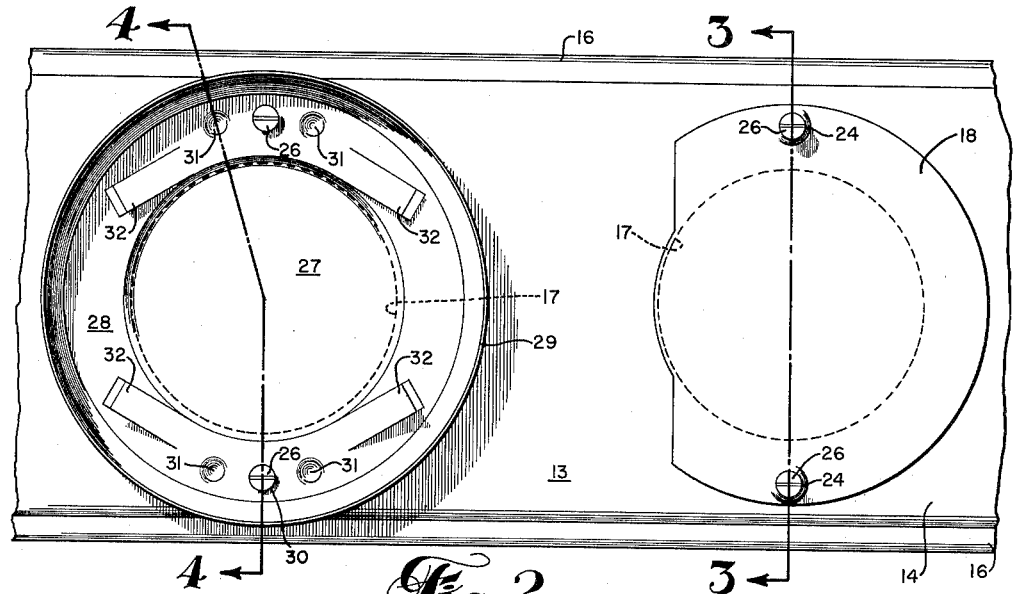
Fig. 2
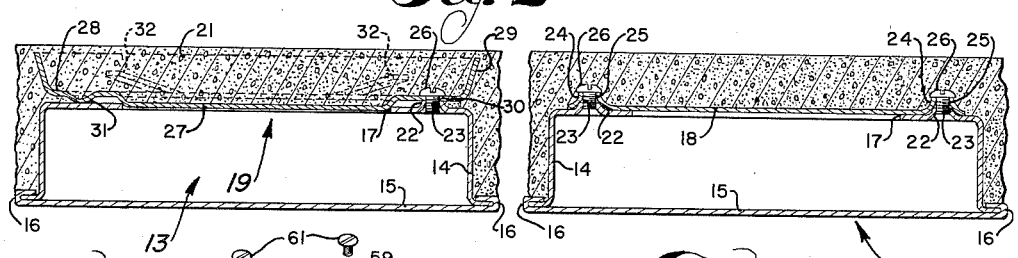
Fig. 3
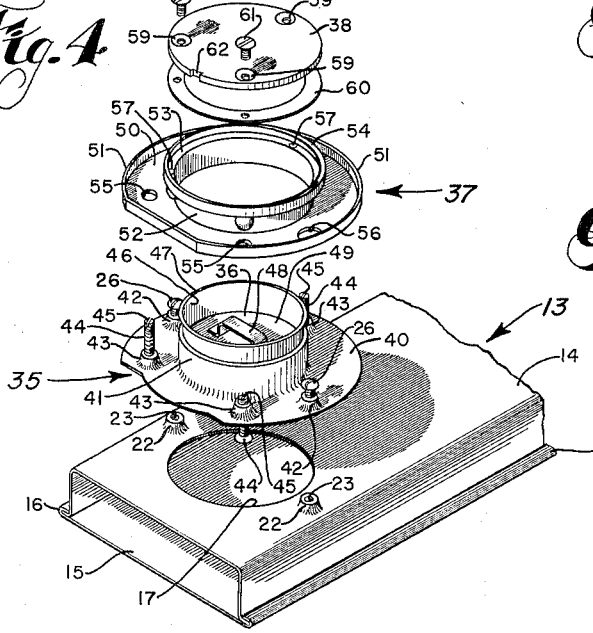
Fig. 4
Fig. 7
INVENTOR.
THOMAS J. SLINGLUFF
BY
*Harry B. Keck*
ATTORNEY June 18, 1963 — T. J. SLINGLUFF — 3,093,933
ELECTRICAL DUCTS AND FITTINGS
Filed Oct. 15, 1959 — 3 Sheets-Sheet 3

INVENTOR.
THOMAS J. SLINGLUFF
BY Harry B. Keck
ATTORNEY

United States Patent Office 3,093,933
Patented June 18, 1963

3,093,933
ELECTRICAL DUCTS AND FITTINGS
Thomas J. Slingluff, Baden, Pa., assignor to
H. H. Robertson Company
Filed Oct. 15, 1959, Ser. No. 846,659
1 Claim. (Cl. 50—127)

This invention relates to cross-over electrical ducts and auxiliary fittings, especially cross-over ducts adapted for use in building structures in combination with cellular electrical service flooring.

For many years cellular flooring has been employed in building construction to provide versatility in electrical service. Cellular flooring comprises a plurality of metallic parallel enclosed channels which are supported by beams and girders in a building frame. Concrete or other suitable aggregate floor covering is poured on top of the cellular flooring to form the floors in the resulting building. The enclosed metal cells, beneath the floor covering, remain available throughout the life of the building as passageways for electrical wiring. In order to introduce wiring into a selected flooring cell or to transfer wiring from one selected flooring cell to another selected flooring cell, cross-over ducts are provided which extend transversely of the flooring cells in contact with the outer horizontal surface thereof. Means are provided for opening the cross-over ducts at any time during the life of the building to permit access into the ducts or through the ducts to any selected flooring cell.

Because the cross-over ducts and the flooring cells are destined to serve as passageways for electrical conductors having external insulation coatings, there has been a requirement through the years that the ducts and flooring cells be maintained free of obstructions which might rupture or damage the insulation coating as the electrical conductors are drawn through the ducts and flooring cells. Heretofore, in order to maintain the ducts free of obstructions, the fabrication of the ducts and installation of fittings has been relatively expensive. At the present time external mounting brackets are provided on the flanges of electrical cross-over ducts to support various electrical fittings as shown in U.S. Patent 2,445,197. Alternatively rivets and grommets have been used to fasten the necessary fittings to the electrical cross-over ducts as shown in U.S. Patent 2,824,578.

According to the present invention I have provided electrical cross-over ducts and auxiliary fittings which are inexpensive to fabricate, easy to assemble, and meet the unobstructed passageway requirement of such structures. Specifically the present invention requires for auxiliary fittings no external mounting brackets, no rivets, and no fastening grommets.

Instead, auxiliary electrical fittings may be attached to the present cross-over electrical ducts by means of screws driven externally into the cross-over electrical ducts. The cross-over electrical ducts are provided with a convex external dimple, each having a central threaded opening to receive a screw. All of the auxiliary fittings have geometrically congruent openings through which a fastening screw extends into the threaded opening in the dimples of the electrical cross-over ducts. The threaded shaft end of each fastening screw remains entirely within the internal volume of the dimple and thus does not penetrate into the cross-section of the duct through which electrical conductors may extend.

Auxiliary electrical fittings may include, by way of example, a blind flange, a dish shaped cover, and an electrical floor outlet.

The invention will be more fully described by reference to the accompanying drawings in which:

FIGURE 2 is a plan view of the electrical cross-over duct of the present invention showing a blind flange and a dish shaped cover plate;

FIGURE 3 is a cross-section view taken along the line 3—3 of FIGURE 2 showing a cross-over electrical duct and a blind flange;

FIGURE 4 is a cross-section view taken along the line 4—4 of FIGURE 2 showing a cross-over electrical duct and dish shaped cover plate;

FIGURE 7 is an exploded view of the vertically adjustable floor outlet shown in FIGURES 5 and 6.

Figure 1:
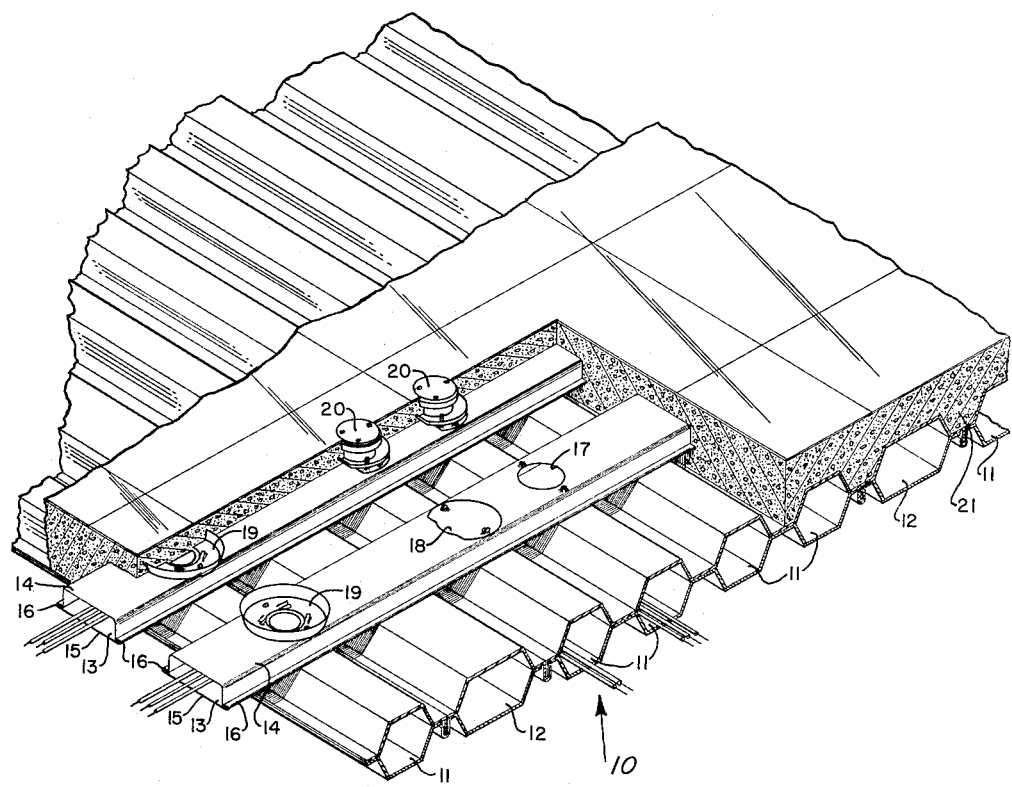
FIGURE 1 is a perspective illustration of a typical floor structure employing cellular flooring and electrical cross-over ducts.

Referring to FIGURE 1, there is illustrated a typical building floor installation including cellular flooring 10, which may include electrical carrying cells 11 and enlarged air carrying cells 12. Cross-over electrical ducts 13 according to this invention extend transversely of the cells 11 in the cellular flooring 10. The cross-over electrical ducts 13 include a U-shaped channel 14 and a flat sheet 15. Flanges 16 are provided along each side of the duct 13 to secure the two elements 14 and 15 into an assembled structure. Usually the flat sheet 15 is placed in contact with cellular flooring and the U-shaped channel 14 is exposed.

Circular openings 17 are provided at spaced points along the exposed surface of the U-shaped channel 14 corresponding to the spacing of the electrical carrying cells 11. The circular openings 17 are covered for example, by means of a blind flange 18, a dish shaped cover plate 19, or a vertically adjustable floor mounted electrical outlet 20.

In completing construction of the building, a layer 21 of concrete or similar aggregate flooring material is poured on top of the cellular flooring 10 and cross-over electrical ducts 13.

Vertically adjustable floor mounted electrical outlets 20 are provided for immediate access to electrical service in the ducts and cells in the resulting building. Openings, not shown in FIGURE 1, are cut into the flat sheet 15 and the upper surface of that subjacent electrical flooring cell 11 which is beneath an electrical floor outlet 20. The communication thus provided between the cross-over electrical duct 13 and the subjacent electrical flooring permits cell extension of electrical conductors therethrough. Readily removable floor caps are provided for the electrical floor outlets 20 to permit access to the conductors in order to make electrical connections into the room space above the flooring layer 21.

For future access to electrical service, it is possible to locate beneath the flooring layer 21 any of the blind flanges 18 or the dish shaped cover plates 19 by geometrical measurements. A portion of the flooring layer 21 immediately above the selected circular opening 17 may be removed to expose the opening 17 for affixation at that time of a suitable electrical floor outlet corresponding to those indicated by the numeral 20.

The present invention as applied to cross-over electrical ducts can be readily understood by reference to FIGURES 2 and 3 wherein a pair of outwardly convex dimples 22 are provided diametrically opposed at equal distances from the center of the circular opening 17 in the U-shaped channel 14. An opening 23 for threadedly engaging a fastening screw appears at the center of the dimples 22. The opening 23 may be threaded or may be threadable by means of a self-tapping fastening screw.

A blind flange 18 comprising a flat sheet of metal adapted to cover the circular opening 17 is provided with externally convex dimples 24 which are adapted to engage the dimples 22 in the U-shaped channel 14 when the blind flange 18 entirely covers the circular opening 17. Openings 25 are provided at the center of the dimples 24 to receive a fastening screw 26. The fastening screw 26 is slidable in the opening 25 and threadedly engageable in the opening 23. The threaded shaft of the fastening screw 26 is relatively short so that when the fastening screw 26 is tightly threaded into the opening 23, the tip of the fastening screw 26 does not penetrate into the generally rectangular cross-section of the cross-over electrical duct 13. Instead, the threaded shaft of the fastening screw 26 is entirely within the conical volume formed by the inner walls of the dimple 22.

Referring to FIGURES 2 and 4, a dish shaped cover plate 19 is illustrated. The cover plate 19 is punched from a single sheet of metal and has at its center a circular flat portion 27 which is adapted to engage the circular opening 17. An annular flat plate 28 surrounds the circular flat portion 27 and peripherally terminates into an upwardly flared rim 29. Openings 30 are provided in the annular plate 28 diametrically opposed to each other and corresponding to the dimples 22. A pair of downwardly convex dimples 31 is provided on each side of the openings 30. The dish shaped cover plate 19 rests upon the dimples 31 when the circular flat portion 27 is positioned within the opening 17. Fastening screws 26, as previously described, extend through the openings 30 for threaded engagement with the openings 23 in the dimples 22 of the U-shaped channel 14. If desired, slightly longer fastening screws may be employed for securing the dish shaped cover plate 19 by providing cylindrical sleeves of suitable length so that the head of the longer fastening screw is close to the upper surface of the flooring layer 21 while the tip of the threaded shaft is maintained out of the generally rectangular cross-section of the cross-over electrical duct 13.

Desirably a plurality of tongues 32 are punched from the annular plate 28 and upwardly bent. The upwardly bent tongues 32 serve as a retaining means for the flooring layer 21 subsequently poured over the metal flooring.

The principal utility of the dish shaped cover plates 19 is that they provide a ready means for exposing a selected opening 17 when electrical access is desired at a location not theretofore employed. The dish shaped cover plates 19 can be located geometrically and, by means of light tapping with a hammer, the flooring layer 21 immediately above the dish shaped cover plate 19 can be neatly extracted. The rim 29 is positioned only slightly beneath the upper surface of the flooring layer 21, perhaps one-eighth inch. Subsequent withdrawal of the fastening screws 26 permits removal of the cover plate 19 without allowing spillage of the superposed portion of the flooring layer 21 into the cross-over electrical duct 13 through the opening 17. Thereafter an electrical outlet fitting 20 may be assembled above the selected opening 17 to provide the desired electrical access.

Note that the fastening screws 26, as shown in FIGURE 4, are positioned entirely out of the cross-sectional area of the cross-over electrical duct 13 within the volume of the dimple 22.

Figure 5:
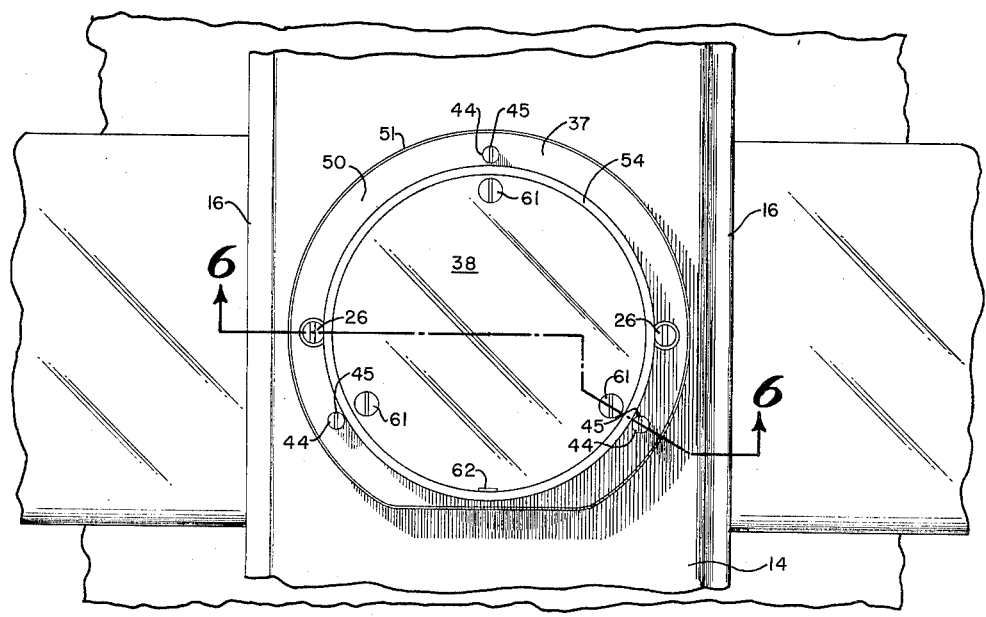
FIGURE 5 is a plan view of a cross-over electrical duct showing a vertically adjustable floor outlet.

The electrical outlet fitting illustrated in FIGURES 5, 6 and 7 will now be described. The electrical outlet fitting 20 may be installed before the flooring layer 21 is poured or at any time thereafter. The fitting 20 has vertical adjustability and leveling features. Four principal elements are included in the fitting 20 as shown. These include a base plate 35, a recessed cover 36, a leveling plate 37 and a floor cap 38.

The base plate 35 includes an annular flat plate 40 and a centrally upwardly flared tube 41. Diametrically opposed to the geometric center of the annular base 40 are two outwardly convex dimples 42 which engage the dimples 22 of the U-shaped channel 14. When the base plate 35 is positioned above the U-shaped channel 14, fastening screws 26 may be extended through openings in the dimples 42 for threaded engagement with the threaded openings 23 of the dimples 22. The base portion 40 surrounds the opening 17 and the tube 41 is centrally positioned thereabove.

Countersunk openings 43 are provided in the base portion 40 to receive conical headed screws 44 which have a turning slot 45 at the end of their threaded shaft. The threads of the screws 44 are not secured in the countersunk openings 43. Instead, the screws 44 are free to turn within the openings 43 when the base plate 35 is secured to the U-shaped channel 14 by means of the fastening screws 26.

The recessed cover 36 is formed from a single sheet of metal having a flat circular bottom sheet 49, a cylindrical side wall 46 and an upper outwardly turned lip 47. The cylindrical side walls 46 fit into the tube 41 of the base plate 35. The upper outwardly turned lip 47 extends radially over the upper lip of the tube 41. If desired, a bent metal handle 48 may be spot welded to the circular bottom sheet 49 of the recessed cover 36. The handle 48 facilitates installation and removal of the recessed cover 36 when desired.

The leveling plate 37 comprises a flat annular plate 50 which may have an upwardly turned rim 51 for stiffening purposes if desired. A circular sleeve 52 extends upwardly from the annular plate 50. The circular sleeve 52 joins a radial shoulder 53 and a circular rim 54. The inner diameter of the circular sleeve 52 exceeds the outer diameter of the tube 41 whereby the leveling plate 37 may be positioned annularly of the tube 41. A plurality of threaded openings 55 is provided in the annular plate 50 corresponding to the positions of the leveling adjustment screws 44. The leveling adjustment screws 44 are threadedly engaged into the threaded openings 55 and, by means of turning the leveling screws 44 through the turning slots 45, the leveling plate 37 may be elevated or lowered with respect to the electrical cross-over duct 13. Two additional diametrically opposed openings 56 are provided in the annular plate 50 corresponding in position to the dimples 42 on the base plate 35. The enlarged circular openings 56 provide an aperture through which the fastening screws 26 may be installed or removed.

A plurality of threaded screw holes 57 is provided in the shoulder 53 to secure the floor cap as will be described.

The floor cap 38 is a circular plate having peripheral countersunk screw openings 59. A gasket 60 having screw openings corresponding to the screw openings 59 in the floor cap 38 is provided to form a moisture-proof seal between the floor cap 38 and the shoulder 53. Flat headed screws 61 extend through the countersunk holes 59 and through the holes in the gasket 60 into the threaded holes 57 in the shoulder 53.

The leveling screws 44 permit adjustment of the leveling plate 37 whereby the rim 54 of the leveling plate 37 is coplanar with the surface of the flooring layer 21.

Figure 6:
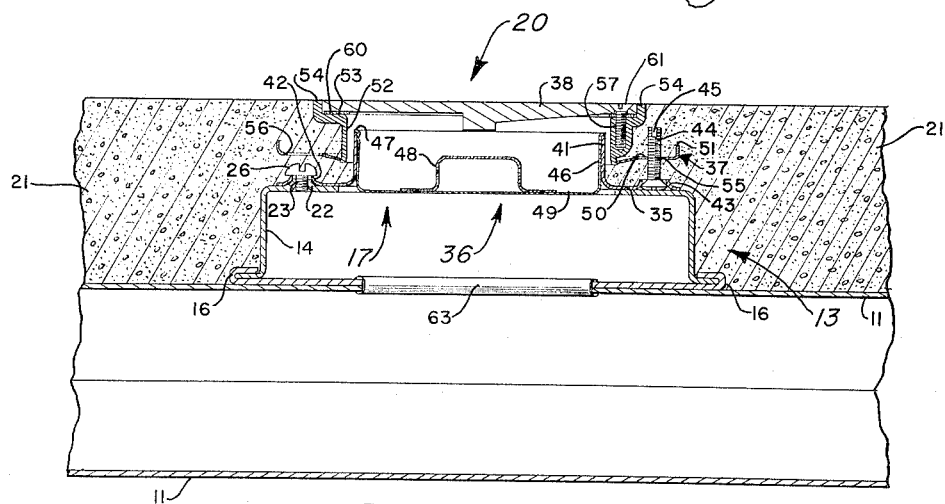
FIGURE 6 is a cross-section view taken along the line 6—6 of FIGURE 5 showing a flooring cell, a cross-over electrical duct and a vertically adjustable floor outlet.

Desirably a prying slot 62 is provided in an unobtrusive position along the rim of the floor cap 38 to assist in raising the floor cap when electrical access is desired.

Where access is desired directly into an electrical carrying cell 11, openings may be cut through the flat plate 15 and the upper plate of the floor cell 11 as shown in FIGURE 6. To avoid contact of insulation covered conductors with possible jagged edges of the cut openings, it is desirable to place a soft metal grommet 63 along the exposed periphery. Suitable tools for this purpose are described in U.S. Patent 2,578,619.

While the cross-over electrical ducts and auxiliary fittings of this invention have especial utility in combination with metallic cellular flooring, nevertheless such electrical ducts frequently are employed in poured concrete flooring which does not include metallic cellular flooring. The present invention is equally useful and advantageous in such installations.

According to the provisions of the patent statutes, I have explained the principle, preferred embodiment and mode of operation of my invention and have illustrated and described what I now consider to represent its best embodiment. However, I desire to have it understood that, within the scope of the appended claim, the invention may be practiced otherwise than as specifically illustrated and described.

I claim:

The combination of an electrical outlet fitting and an electrical duct, said duct having flat exposed and unexposed horizontal walls and connecting side walls,
- said exposed wall having at least one circular wire passageway opening,
- a plurality of outwardly raised dimples annularly disposed about the said opening and projecting above said exposed wall, each of said dimples having at its center a screw-receiving opening, said fitting comprising:
- a base plate having a flat base annularly disposed about said wire passageway opening and an outwardly flared central tube, said flat base having first countersunk fastening-screw-apertures corresponding to said outwardly raised dimples, said flat base having second countersunk leveling-screw-apertures,
- conical headed leveling screws each having a threaded shaft extending outwardly through said second countersunk apertures,
- a leveling plate having a central sleeve surrounding said central tube,
- a radial flange extending outwardly from said sleeve adjacent to said base plate and having threaded openings threadedly engaged with the shafts of said leveling screws and having tool access openings spaced outwardly from said first countersunk apertures,
- said sleeve having an annular recess remote from said base and a circular floor cap peripherally engaged with the said sleeve within the said annular recess.

References Cited in the file of this patent

UNITED STATES PATENTS

| | | |
|---|---|---|
| 843,962 | McMurtie | Feb. 12, 1907 |
| 925,865 | Brown | June 22, 1909 |
| 976,134 | Mörk | Nov. 15, 1910 |
| 1,220,463 | Schnug | Mar. 27, 1917 |
| 1,411,184 | Rosenberg | Mar. 28, 1922 |
| 1,945,683 | Fullman | Feb. 6, 1934 |
| 1,996,371 | Fullman | Apr. 2, 1935 |
| 2,353,121 | Adam et al. | July 11, 1944 |
| 2,672,749 | Wiesmann | Mar. 23, 1954 |
| 2,763,294 | Kennedy | Sept. 18, 1956 |
| 2,824,578 | Blinn et al. | Feb. 25, 1958 |
| 2,931,533 | Wiesmann | Apr. 5, 1960 |
| 2,975,559 | Hedgren | Mar. 21, 1961 |